US008157902B2

(12) United States Patent
Ogut et al.

(10) Patent No.: US 8,157,902 B2
(45) Date of Patent: Apr. 17, 2012

(54) NON-THERMAL PLASMA PARTICULATE REMOVAL SYSTEMS AND METHODS THEREOF

(75) Inventors: Ali Ogut, Pittsford, NY (US); Richard Backus, Rochester, NY (US)

(73) Assignee: Environmental Energy Technologies, Inc., Rochester, NY (US)

( * ) Notice: Subject to any disclaimer, the term of this patent is extended or adjusted under 35 U.S.C. 154(b) by 486 days.

(21) Appl. No.: 12/411,056

(22) Filed: Mar. 25, 2009

(65) Prior Publication Data

US 2009/0241775 A1 Oct. 1, 2009

Related U.S. Application Data

(60) Provisional application No. 61/039,300, filed on Mar. 25, 2008, provisional application No. 61/039,303, filed on Mar. 25, 2008.

(51) Int. Cl.
*B03C 3/70* (2006.01)

(52) U.S. Cl. ............ 96/88; 55/DIG. 10; 55/DIG. 30; 60/275; 95/5; 95/59; 95/81; 96/20; 96/28; 96/83

(58) Field of Classification Search ............... 95/59, 68, 95/74, 5, 80, 81; 96/28, 83, 88, 95, 20, 21; 55/282.3, DIG. 10, DIG. 30; 60/275; 422/186.04; 204/164
See application file for complete search history.

(56) References Cited

U.S. PATENT DOCUMENTS

| 4,634,806 | A | * | 1/1987 | Haag et al. ............... 174/211 |
| 5,263,317 | A | * | 11/1993 | Watanabe et al. .......... 60/275 |
| 5,421,863 | A | * | 6/1995 | Rector et al. .............. 96/60 |
| 6,156,099 | A | * | 12/2000 | Hironaka et al. ........... 95/74 |
| 6,482,368 | B2 | * | 11/2002 | Hemingway et al. ..... 422/186.04 |
| 6,852,200 | B2 | * | 2/2005 | LaBarge et al. ............ 204/177 |
| 6,893,617 | B2 | | 5/2005 | Li et al. |
| 7,331,170 | B2 | | 2/2008 | Shimoda |
| 7,625,531 | B1 | | 12/2009 | Coates et al. |
| 7,776,140 | B2 | * | 8/2010 | Fleck ...................... 96/69 |

(Continued)

FOREIGN PATENT DOCUMENTS

JP  1-258754  A  * 10/1989

OTHER PUBLICATIONS

International Search Report and Written Opinion of the International Searching Authority, dated Oct. 20, 2009 for corresponding International Patent Application PCT/US2009/038250, filed Mar. 25, 2009.
Brown, S.C., (1959). The Corona Discharge. The MIT Press, "Basic Data of Plasma Physics," Ch. 13, pp. 258-274. Cambridge, Massachusetts.

(Continued)

*Primary Examiner* — Richard L Chiesa
(74) *Attorney, Agent, or Firm* — Burns & Levinson LLP; Janine M. Susan, Esq.; Orlando Lopez (57) ABSTRACT

The present invention is broadly directed to non-thermal plasma-based systems for reducing the amount of particulate matter in a gas stream, as well as to methods for using such systems. The present invention is particularly directed to such non-thermal plasma-based particulate matter reduction systems with self-cleaning surfaces. Particularly contemplated are self-cleaning surfaces that reduce particulate matter buildup such as is likely to cause the reduction of non-thermal plasma production in the system, and therefore the ability of such systems to reduce the amount of particulate matter in the gas stream.

25 Claims, 4 Drawing Sheets

U.S. PATENT DOCUMENTS

| | | |
|---|---|---|
| 2004/0185396 A1* | 9/2004 | Rosocha et al. .................. 431/2 |
| 2005/0019714 A1* | 1/2005 | Platts et al. ........................ 431/2 |
| 2006/0021327 A1* | 2/2006 | Kiser et al. ....................... 60/278 |
| 2007/0045101 A1* | 3/2007 | Ogut et al. .................... 204/177 |
| 2008/0022660 A1 | 1/2008 | Reuter et al. |
| 2008/0314734 A1* | 12/2008 | Kim et al. ..................... 204/170 |

OTHER PUBLICATIONS

Brown, S.C., (1959). Arc Discharges. The MIT Press, "Basic Data of Plasma Physics," Ch. 16, pp. 310-325. Cambridge, Massachusetts.

* cited by examiner

NON-THERMAL PLASMA PARTICULATE REMOVAL SYSTEMS AND METHODS THEREOF

RELATED APPLICATIONS

This application claims the benefit of U.S. Provisional Application Nos. 61/039,300 and 61/039,303, both filed Mar. 25, 2008.

FIELD OF THE INVENTION

The present invention is broadly directed to non-thermal plasma-based systems for reducing the amount of particulate matter in a gas stream, as well as to methods for using such systems. The present invention is particularly directed to such non-thermal plasma-based particulate matter reduction systems with self-cleaning surfaces. Particularly contemplated are self-cleaning surfaces that reduce particulate matter buildup such as is likely to cause the reduction of non-thermal plasma production in the system, and therefore the ability of such systems to reduce the amount of particulate matter in the gas stream.

BACKGROUND OF THE INVENTION

Internal combustion engines fueled by gasoline or diesel, either alone or in combination with other compounds (e.g., ethanol), are sources of large amounts of air and other environmental pollutants that impact the health and lifespan of the world human population, as well as the environment as a whole. Thus for example carbon monoxide (CO), nitrogen oxides ($NO_x$), sulfur dioxide ($SO_2$), non-methane hydrocarbons (NMHCs) and particulate matter (PM) are produced as a result of the combustion of gasoline or diesel fuel in stationary, on-road, and off-road engines. Despite decades of regulation, these and other pollutants continue to be released into the environment in amounts that exceed regulatory standards, even in countries with strict emission controls. In the United States, for example, even after decades of stringent air pollution regulations, over 150 million people still live in areas where pollution levels exceed national ambient air quality standards (NAAQS). See, e.g., epa.gov/airtrends/sixpoll.html.

In order to reduce the amounts of combustion engine-generated pollutants, increasingly stringent gas- and diesel-fueled engine emissions standards have been enforced in the United States and abroad. Unfortunately, robust technologies for meeting these standards have been difficult to obtain. Particulate matter emission levels in the United States alone, for example, although reduced by 33% and 51% between 1990 and 2007 for large and small particulates ($PM_{10}$ and $PM_{2.5}$; see below for definitions), even now still amount to over 1 million tons of particulates released into the environment in the United States per year, with about a third of these particulates resulting from highway and off-road vehicle engine sources, most of which are equipped with emissions control devices. See, e.g., epa.gov/air/airtrends/2008/report/Highlights.pdf, the contents of which are herein incorporated in their entirety by reference.

One technology that offers great promise for reducing combustion-engine emissions, particularly particulate matter emissions, is based on the use of non-thermal plasma (NTP) to increase combustion efficiency and/or to improve the reduction of tailpipe emissions. Specifically, plasma is generally defined as an ionization gas, where atoms, positive and negative ions and electrons are intermingled, but which is, in the aggregate (i.e., at a bulk matter or macroscopic level), electrically neutral. See, e.g., Yamamoto and Okubo, Non-thermal Plasma Technology, in the Handbook of Environmental Engineering, Vol. 5: Advanced Physiochemical Treatment Technologies, Humana Press (synonymously, "Yamamoto and Okubo"), the contents of which are herein incorporated in its entirety by reference. "Thermal plasmas" are plasmas where the temperatures of the constituent atoms, ions and electrons of the plasma are the same (i.e., at thermal equilibrium and "hot"); non-thermal plasmas (NTPs) are typically non-equilibrium plasmas where the electrons are "hot" while the other species in the plasma are thermally "cold." Electric arcs are an example of thermal plasmas; low temperature devices, such as neon lamps, are an example of non-thermal plasmas.

With regard to combustion efficiency, preliminary studies indicate that NTPs can be used to break up large organic fuel molecules into smaller molecules that are more easily and completely combusted; see, e.g., U.S. Patent Publication Nos. 2004/0185396, 2005/0019714, and 2008/0314734, the contents of which are herein incorporated in their entireties by reference. The result of such increases in combustion efficiency is improved fuel consumption and, indirectly, potentially fewer tailpipe emissions.

Other studies have shown that NTPs can be used to directly reduce tailpipe emissions. For example, in a large number of studies NTPs have been generated by a variety of means in systems that aim to reduce $NO_x$ emissions. See, e.g., U.S. Pat. Nos. 6,482,368 and 6,852,200, the contents of which are herein incorporated in their entireties by reference. Other systems use NTP to reduce particulate matter (PM). See, e.g., U.S. Pat. No. 5,263,317 and U.S. Patent Publication No. 2007/0045101, the contents of which are herein incorporated in their entireties by reference.

Despite the attractiveness of NTP-based systems for reducing engine emissions, the use of this technology has been complicated by the effects of the pollutants and breakdown products in exhaust gases on these systems. In this regard, particulate matter is especially problematic, since its accumulation in these systems can cause the physical blockage of narrow gas-flow regions. Such PM can also degrade or destroy the performance of NTP systems by coating the components involved in the generation of NTP. In the case of systems where NTP is generated electrically, PM accumulation can cause power losses via the redirection of current into conductive paths created by the accumulation of this conductive material, thereby reducing the amount of NTP generated, and therefore the amount of particulate matter removed. Another concern is the amount of power consumed to reduce the PM. Existing NTP systems can consume hundreds of watts of power just to reduce PM by 25%. Energy used to power the system reduces the power available for other uses and increases the emissions. NTP systems with a greatly increased reduction per watt of power used are therefore needed to reduce total emissions.

In light of the above, it is clear that there is a need for better NTP-based pollution reduction systems, particularly NTP-based systems in which PM accumulation within such systems is efficiently reduced or prevented.

SUMMARY OF THE INVENTION

The present invention is broadly directed to non-thermal plasma-based systems for reducing the amount of particulate matter (PM) in a gas stream, as well as to methods for using such systems. The present invention is particularly directed to such non-thermal plasma-based particulate matter reduction systems with self-cleaning surfaces. Particularly contemplated are self-cleaning surfaces that reduce particulate matter buildup such as is likely to cause the reduction of non-thermal plasma production in the system, and therefore the ability of such systems to reduce the amount of particulate matter in the gas stream.

In a first embodiment, the present invention provides an apparatus for reducing the amount of particulate matter in a gas stream, comprising: a) a first conductor contacting the gas stream, where the first conductor comprises a portion producing non-thermal plasma (NTP); b) a second conductor contacting the gas stream and electrically paired to the first conductor; and, c) an insulator electrically isolating the first conductor from the second conductor, where the insulator is a self-cleaning insulator.

In a second embodiment the self-cleaning insulator of the apparatus of the first embodiment is cleaned by oxidative self-cleaning.

In a third embodiment, the self-cleaning insulator of the apparatus of the first embodiment comprises an insulating portion which is sufficiently thin for oxidation of conductive material accumulated on its surface.

In a fourth embodiment, the self-cleaning insulator of the apparatus of the first embodiment comprises a portion that is less than nominal thickness.

In a fifth embodiment, the portion of the self-cleaning insulator of the fourth embodiment that is less than nominal thickness is of a thickness selected from the group consisting of 50%, 60%, 70%, 80%, and 90% of the nominal thickness.

In a sixth embodiment, the apparatus of the first embodiment further comprises one or more non-eroding washers.

In a seventh embodiment, the one or more non-eroding washers of the apparatus of the sixth embodiment are provided at the proximal end of the self-cleaning insulator.

In an eight embodiment, the one or more non-eroding washers of the apparatus of the sixth embodiment are provided at both the proximal end and the distal end of the self-cleaning insulator.

In a ninth embodiment, the first conductor of the apparatus of the first embodiment is negatively polarized.

In a tenth embodiment, the first conductor of the apparatus of the first embodiment has a pulsed direct current applied to it.

In an eleventh embodiment, the pulsed direct current of the tenth embodiment has a pulse width of between about 100 ns and about 1 ms.

In a twelfth embodiment, the present invention provides a method for reducing the amount of particulate matter in a gas stream, comprising exposing the gas stream to the NTP generated by the apparatus of the first embodiment.

In a thirteenth embodiment, the method of the twelfth embodiment further provides that the self-cleaning insulator of the apparatus of the first embodiment comprises an insulating portion which is sufficiently thin for oxidation of conductive material accumulated on its surface.

In a fourteenth embodiment, the method of the twelfth embodiment further provides that the thickness of the self-cleaning insulator is selected from the group consisting of 50%, 60%, 70%, 80%, and 90% of the nominal thickness.

In a fifteenth embodiment, the method of the thirteenth embodiment further comprises one or more non-eroding washers.

In a sixteenth embodiment, the gas stream of the method of the twelfth embodiment is produced in a system containing at least one Exhaust Gas Recirculation (EGR) system, and where exposure of the gas stream to the NTP generated by the apparatus of the first embodiment occurs between the engine exhaust and the at least one EGR system.

In a seventeenth embodiment, the method of the sixteenth embodiment further provides that the self-cleaning insulator of the apparatus of the first embodiment comprises an insulating portion which is sufficiently thin for oxidation of conductive material accumulated on its surface.

In an eighteenth embodiment, the method of the sixteenth embodiment further provides that the thickness of the self-cleaning insulator is selected from the group consisting of 50%, 60%, 70%, 80%, and 90% of the nominal thickness.

In a nineteenth embodiment, the apparatus of the first embodiment further comprises one or more non-eroding washers.

In a twentieth embodiment, the present invention provides a method for reducing the amount of particulate matter in a gas stream produced in a system containing more than one exhaust valve, comprising exposing the gas stream at each exhaust valve to the NTP generated by the apparatus of the first embodiment.

In a twenty-first embodiment, the present invention provides an apparatus for reducing the amount of particulate matter in a gas stream, comprising: a) a first conductor contacting the gas stream, where the first conductor comprises a portion producing nonh-thermal plasma (NTP); b) a second conductor contacting the gas stream and electrically paired to the first conductor; and, c) an insulator electrically isolating the first conductor from the second conductor, where the insulator is a self-cleaning insulator; where the self-cleaning insulator is cleaned by oxidative self-cleaning, where the apparatus further comprises one or more non-eroding washer, and where the first conductor of the apparatus has a pulsed direct current applied to it.

BRIEF DESCRIPTION OF THE DRAWINGS

The following drawings are presented solely to illustrate various embodiments of the present invention, as may also be disclosed elsewhere; these drawings are not intended to, nor should they be taken as, in any way limiting the scope of the present invention.

DETAILED DESCRIPTION OF THE INVENTION

The present invention is broadly directed to non-thermal plasma-based systems for reducing the amount of particulate matter (PM) in a gas stream, as well as to methods for using such systems. The present invention is particularly directed to such non-thermal plasma-based particulate matter reduction systems with self-cleaning surfaces. Particularly contemplated are self-cleaning surfaces that reduce particulate matter buildup such as is likely to cause the reduction of non-thermal plasma production in the system, and therefore the ability of such systems to reduce the amount of particulate matter in the gas stream.

Thus the present invention is broadly directed to NTP-based systems for reducing the amount of particulate matter in a gas stream. "NTP" refers to non-thermal plasma, which has its usual art-defined meaning, as provided in, e.g., the Background section of this application, Yamamoto and Okubo, etc. In the present invention, NTP is preferably electrically generated, although other embodiments in which NTP is generated by other means (e.g., by light) are also contemplated. Applicants note that in either case the reduction of accumulated PM within these systems is desirable in order to improve the robustness and lifetime of these systems as well as their ability to reduce PM in the gas stream flowing through these systems. In the case of electrically generated NTP, the reduction of accumulated PM is particularly important, because such PM can cause power losses via the redirection of current into conductive paths created by the accumulation of this conductive material, thereby reducing the amount of NTP generated, and therefore the amount of particulate matter removed.

"Gas stream" refers to a gas stream as is produced as the gaseous emissive output from a combustion engine, particularly a diesel-fueled engine, although the present invention also contemplates the gas stream produced from a gasoline-fueled engine as well as gas streams from engines fueled by diesel or gasoline in combination with other fuel components, e.g., ethanol. The present invention is not limited to these exemplars, and contemplates other gas streams, e.g., one as would occur in the output of a power-generating plant where coal or oil is burned, etc. "Gas stream" is contemplated as referring to a flowing gas, with the flow rates preferably those commonly found at the output of a diesel- or gasoline-fueled combustion engine. However, in some embodiments it may be preferable to alter the flow rate, particularly by lowering the rate of flow. In other aspects, alteration of flow may be by channeling of gas within the NTP-based systems of the invention to direct the gas more efficiently through the NTP generated by such systems.

The present invention is directed to reducing the amount of particulate matter (PM) in a gas stream by exposure of the gas stream to NTP. In this regard, the present application is particularly directed to (although not limited to) PM as is regulated by pollution standards, i.e., "fine particle" PM of diameter of 2.5 μm and less ($PM_{2.5}$), and larger "inhalable coarse particle" PM of greater than 2.5 μm and less than 10 μm in diameter ($PM_{10}$). See, e.g., epa.gov/air/particlepollution/health.html for general information regarding such PM and links to specific U.S. regulations regarding these particles. Although the present invention is not limited to $PM_{2.5}$ and $PM_{10}$ particles, particles in this size range are a particular focus of the present invention because they are small enough to deeply penetrate the lungs and possibly the bloodstream, and therefore are of a size where effects on, e.g., respiration, lung function, asthma, bronchitis, irregular heartbeat, nonfatal heart attacks and premature death in individuals with heart or lung disease, are all more pronounced.

With regard to the chemical composition of the PM to be removed by the present invention, the present invention is directed to removing various kinds of particulate matter from a gas stream, including particularly (but not limited to) heavily carbonaceous particulates, i.e., particles containing a significant amount of carbon. Such particles are commonly found in the combustion of fossil fuels, and represent a large proportion of the PM content of the gas stream of the present invention. Removal of such particles are particularly important when the NTP of the present invention is electrically generated, because such particles can act to form conductive paths within the apparatus of the present invention that can act to reduce the amount of power used to generate NTP, and therefore the amount of particulate matter removed "Reducing the amount of particulate matter in a gas stream" as used herein refers to the reduction of particulate matter as measured on, e.g., a filter, by gravimetry, beta-absorption, etc., for the output gas stream from the apparatus of the present invention relative to a gas stream not provided with the apparatus of the present invention. See, e.g., ETCACC_TechnPaper_2005_6_PM10_Corr_factors_ 2004.pdf at air-climate.eionet.europa.eu/docs/. Thus "reduction" in the above context refers to a reduction of PM post-exposure to the apparatus of the present invention relative to the PM content of a gas stream not exposed to this apparatus, with such reduction as measured by mandated means or by means as would be familiar to one of ordinary skill in the art. Applicants note that, in some publications, NTP or other plasma technology is used to reduce PM emissions specifically via electrostatic precipitation. See, e.g., Farnound et al., $12^{th}$ U.S./North American Mine Ventilation Symposium 2008, pages 515-519, available at smenet.org/uvc/minevent-papers/pdf/075.pdf. Although the apparatus and methods of the present invention allow for some electrostatic precipitation as a means of reducing the amount of PM in a gas stream, electrostatic precipitation is not the primary means of such reduction in the present invention, because such precipitation on the surfaces of the apparatus of the present invention will ultimately cause fouling/degradation of performance of the present invention. Thus the present invention explicitly aims to reduce or eliminate the long-term accumulation of PM within the apparatus of the invention, i.e., accumulation in amounts and over such time periods as would either cause the device to fail, or to require cleaning by means other than the self-cleaning methods described elsewhere in the present document.

Figure 1:
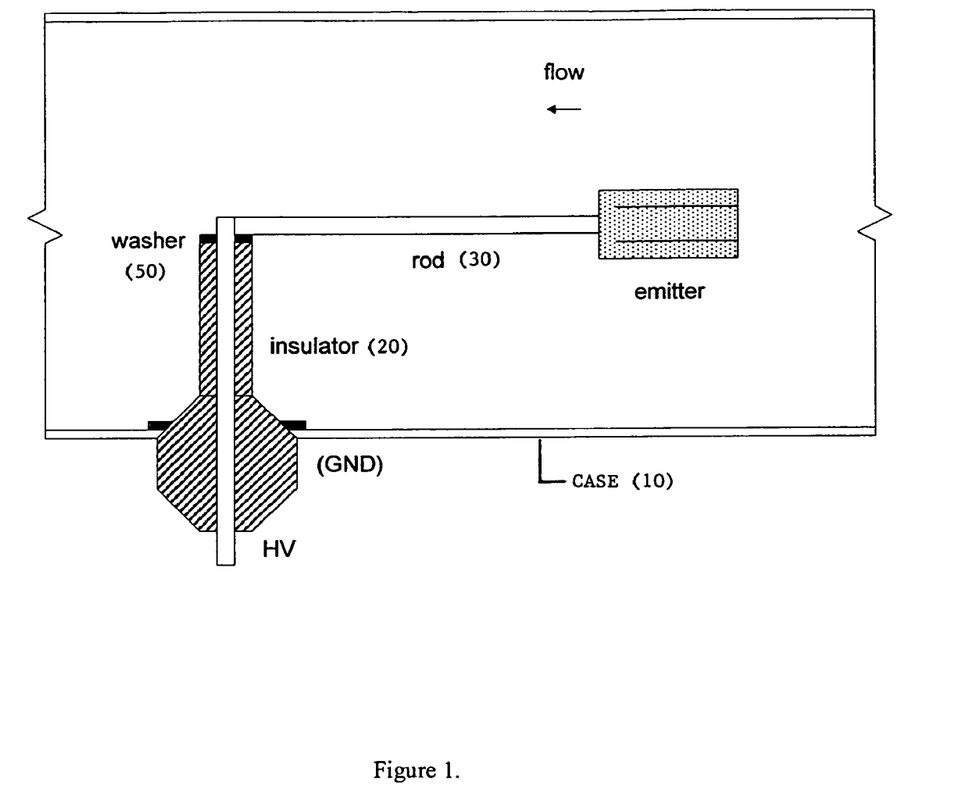
FIG. 1 provides a schematic diagram of one non-limiting embodiment of the apparatus of the present invention.

In a preferred aspect of the present invention, NTP is electrically generated, specifically by the application of a pulsed high voltage direct current between a first conductor (preferably of negative polarity) and a second conductor electrically paired to the first, where both conductors are electrically in contact with the gas stream (in preferred embodiments of the present invention, conductors are in physical contact with the gas stream; it is possible, however, for the second conductor(s) it is possible that this conductor is in electrical contact with the gas stream via an additional conductor or conductors). Applicants note that, although the discussions herein are generally directed to two conductors, in fact the present invention explicitly includes configurations in which more than two conductors are used. Thus for example FIG. 1 shows a first conductor consisting of one central rod (30)/emitter (40) separated by electrically isolating insulator (20) from a second conductor, case (10). However, alternate embodiments in which multiple first conductors consisting of, e.g., the rod/emitter of FIG. 1 penetrate a second conductor such as case (10) at multiple insulator-protected points are also contemplated. See, e.g., conductors 20(1) and 20(2) of FIG. 1 of U.S. Patent Publication No. 2007/0045101 as a non-limiting example of one configuration of such multiple first conductors. Also explicitly contemplated in the present invention are embodiments in which there is more than one second conductor, as well as embodiments in which there are multiple occurrences of both the first and the second conductors. Thus for example the apparatus exemplified in FIG. 1 could be joined end-to-end with a second apparatus of the same configuration, with the two repeated occurrences of the apparatus separated by a non-conductive portion. In this tandemly repeated configuration, there would be two first conductors and two case (10) conductors. More repetitions of the apparatus of FIG. 1 would yield 3, 4, 5, etc. occurrences of the first conductor and the second conductor. Other embodiments are of course possible, and are explicitly contemplated in the present invention.

Voltages contemplated to generate NTP are typically in the kilovolt (kV) range, i.e., 1, 2, 3, 4, 5, 6, 7, 8, 9, 10 . . . (counting by 1 kV increments) . . . 48, 49, 50 kV, etc. The specific choice of a voltage or voltages for use in the present invention is determined as the amount maximizing NTP generated, while at the same time minimizing current flow via direct arcing between the two conductors across which the high voltage is applied, i.e., arcing between the first and second conductor, or between multiple first and second conductors, depending upon the exact embodiment of the present invention employed. Thus the non-limiting embodiment of the present invention provided in FIG. 1 shows a first conductor as rod (30) ending in emitter (40), with this rod/emitter combination centrally located within a second conductor, case (10). As FIG. 1 further shows, insulator (20) is provided in order to prevent direct conduction between the first conductor where it penetrates through the second conductor, i.e., to provide electrical isolation. However, even with insulator (20) present, with sufficiently high voltages applied between the two conductors, arcing can occur between these conductors, typically along the shortest path between these two conductors.

Further with regard to arcing, although in theory the voltage at which arcing will occur can be estimated based solely on the separation between the conductors of the present invention, arcing is also a function of the composition of the gas stream with which the two conductors are in contact, as well as a function of the accumulation of materials entrained in the gas stream or otherwise deposited from the engine exhaust via the gas stream onto the first and second conductor of the NTP-generator. Thus as the concentration of conductive matter in the gas stream such as carbonaceous PM fluctuates, so too does the likelihood of arcing: greater amounts of such PM generally increase the likelihood of a conductive path leading to arcing, and, conversely, lower amounts of such PM generally decrease the likelihood of a conductive path leading to arcing.

In order to decrease the likelihood of arcing such as that described above, in the present invention the power supplied to the first and second conductors in order to create NTP is pulsed, with a pulse width typically between about 100 ns and about 1 ms (e.g., about 100 ns, 150 ns, 200 ns . . . (incrementing by 50 ns intervals) . . . 1 ms) and a pulse duty cycle of 1-100% (e.g., 1, 2, 3 . . . (incrementing by 1% intervals) . . . 98, 99%). In such a pulsed power situation the time duration of the pulse is less than the time required for a completed arc to form, i.e., the pulse duration is less than the time required for the arc to propagate across the shortest path available to it. Applicants note that, in the pulsed power situation of the present invention, it is appropriate to speak of both an average voltage and a peak voltage for NTP generation. In this regard Applicants contemplate an average voltage of 50%, 55%, 60%, . . . (incrementing by 5% intervals), . . . 95%, 96%, 97%, 98%, 99%, or 100% of the voltage at which arcing occurs, and a peak pulse voltage of 0-100% (incrementing by 1% increments) over arc voltage.

Although arcing can occur as a result of increases in conductive matter in the gas stream alone, a more problematic cause of arcing is the accumulation of conductive matter entrained in the gas stream onto the surfaces of the NTP-generating apparatus. Such accumulation leads to effectively shortened conduction paths between the first and second conductors (or multiple first conductors, multiple second conductors, and combinations thereof), and therefore a high likelihood of arcing along these shortened conductive paths. Referring to the single first conductor/single second conductor embodiment of FIG. 1, for example, carbonaceous PM in the gas stream will, without control measures, tend to deposit on the surface of insulator (20). With sufficient deposition of such matter, a conductive path will form along the surface of this insulator so as to allow current flow (arcing) between the first conductor (i.e., rod (30) in FIG. 1) and the second conductor (i.e., case (10) in FIG. 1). Thus there is a great need for control measures to prevent such arcing from occurring.

The present invention employs a number of such control measures to prevent arcing, either alone or, preferably, in combination. Specifically: 1) the surfaces on which conductive paths leading to arcing are likely to form as a result of PM accumulation are placed far enough downstream (i.e., further along the gas stream path) from the source of NTP generation that PM levels will be drastically lowered by exposure to NTP by the time such surfaces are encountered; and, 2) such surfaces are made out of thin dielectric material(s) arranged around the first conductor(s); when these surfaces become coated with conductive PM, a capacitor is formed (conductive PM/dielectric/first conductor) which then oxidizes off the conductive PM on its surface, i.e., oxidatively self-cleans.

Thus with regard to the first control measure discussed above, as the non-limiting embodiment of FIG. 1 shows, the surface where arcing must be controlled —in this embodiment the portion of insulator (20) protruding from case (10) into the gas flow—is positioned far enough downstream from the source of NTP, in this case emitter (40), so as to allow high levels of destruction of PM by NTP by the time the portion of the gas stream originally exposed to NTP emanating from emitter (40) reaches insulator (20). Thus for the present invention generally the non-thermal plasma generating portion of the apparatus (i.e., the emitter or emitters) is/are arranged to contact the gas stream before other parts of the apparatus related to NTP generation contact the gas stream.

In this regard, the embodiment of FIG. 1 shows a relatively elongated conducting rod (30) as physically supporting and electrically connecting emitter (40) with the remaining portion of the first conductor, i.e., the portion of the first conductor that penetrates down through the center of insulator (20) and through case (10) to the external high voltage supply ("HV" in FIG. 1). The length of rod (30) (or, more generally, of the support/conductor between the emitter and the insulator) is chosen to maximize NTP-based reduction of PM via the transmission-line effect of parallel currents. The greater distance over which the first conductor and second conductors are parallel, the stronger and more symmetrical the electric field, and the greater the output efficiency of the emitter. In addition, the PM has been reduced in quantity by the time such PM moves from the portion of the gas stream where NTP is emitted to the surface where accumulation is to be minimized (generally an insulator). Such a length is chosen based on the structural properties required versus the desirability of greater lengths to increase PM reduction. Thus for example longer lengths may be deleterious beyond a certain point, as there is excessive flex or deformation at such long lengths, leading to emitter motions towards the case and, ultimately, failure of the NTP-generating apparatus. Also longer lengths will at some point lead to an apparatus that is too long to be useful as a drop-in to a conventional exhaust system. Appropriate lengths can be estimated based on the flow rate of the gas stream and the desired time of exposure of PM to NTP. Such lengths also may depend on duct/pipe geometry, and could be up to six diameters from the last cross-section change or bend on this basis alone.

In addition to the placement of the NTP-generating element of the apparatus of the present invention upstream of the other elements, and the use of the appropriate length separation between this element and the surfaces to be kept from accumulating PM, the present invention preferably incorporates a self-cleaning insulator (or, depending upon the embodiment, insulators) to actively (and without intervention) remove accumulating PM from the desired surfaces.

Thus as shown in the non-limiting embodiment of FIG. 1, insulator (20) functions to allow for a preferable placement of, ultimately, emitter (40) at the center of the cylinder defined by the second conductor, case (10), and also functions to electrically isolate the first conductor (rod (30) and emitter (40)) from the second conductor (case (10)) by jacketing the portion of the first conductor descending through insulator (20) to the high voltage source, HV. In a conventional design (representing an embodiment contemplated in the present invention), insulator (20) would be configured so as to assure that no electrical path formed between the first and the second conductor. Thus for example, the nominal thickness of the insulator would be the breakdown voltage (dielectric strength) of the insulator material times the voltage (average or peak depending upon the embodiment of the present invention) used in the circuit. Given the possible accumulation of conductive PM on the insulator, the thickness of the insulator might then be increased in order to 1) provide an extra margin of safety in the event of voltage surges, and 2) provide a longer non-conductive path across which conductive PM would have to accumulate to cause current leakage (arcing).

However, in a preferred embodiment of the present invention, the design considerations provided above are used only on selected portions of the insulator; for the remaining portions, the insulator is purposefully designed to be thinner than conventional design would dictate. In this situation, conductive PM accumulating on the surface of these thinner portions of the insulator-covered conductor becomes a source of electric discharge, with this discharge leading to oxidation and removal of the conductive PM accumulated on these surface portions. The extent of this oxidative self-cleaning depends upon the thickness of the insulator and its dielectric constant, with thinner insulators and higher dielectric constants leading to an increase in oxidation, and therefore greater self-cleaning of the insulator.

FIG. 1 shows one example of such a self-cleaning insulator, specifically insulator (20). This insulator has a portion that penetrates the second conductor (case (10)) subject to conventional design considerations regarding thickness, and also has a second portion (in this example orthogonal to case (10)) which is designed subject to the self-cleaning considerations discussed above, and which consequently is much thinner than the portion penetrating case (10) in order to maximize self-cleaning over its surface. It should be recognized that the bulbous base shown for insulator (20) in FIG. 1 is non-limiting, and merely illustrates the fact that there will be some portions of the insulator where the usual design considerations regarding thickness govern; similarly, the constant thickness of the self-cleaning portion of insulator (20) is similarly non-limiting, since there is no necessary requirement that such constant thickness be maintained in order for effective self-cleaning to occur. In general, any surface texture and shape that provides for sufficient self-cleaning may be used; although not limiting, insulator thicknesses of about 0.1 to 2× nominal (e.g., 10, 20, 30, (incrementing by 10% increments) . . . 180, 190, 200% of nominal) are contemplated herein.

With regard to the first and second conductors used in the generation of NTP, as shown in, e.g., FIG. 1, the apparatus of the present invention will have at least one first conductor, comprising an emitter for generating NTP, and a conductive rod or other coupling device for placing the emitter in the appropriate portion of the gas stream and for electrically connecting the emitter to an external source of high voltage. Applicants note that although the present discussion describes these two components separately, in fact they can be integrated, i.e., an apparatus where the first conductor has an integrated supporting/conductive aspect as well as an emitter (or more than one emitters) aspect is within the scope of the presently contemplated invention.

With regard to the NTP-generation portion of the first conductor, the non-limiting embodiment of FIG. 1 shows a single emitter (40) fulfilling this function; however, the present invention is not limited to a single emitter, and may utilize multiple emitters when desirable. With regard to emitter design, a typical emitter contemplated herein involves multiple sharply pointed conductors closely spaced in order to minimize electrical potential differences, with all the points preferably equally distant from the second conductor. Although any number of points may be used, with greater flow rates a larger number of points are preferable. Although there is no particular emitter length that is required, a length of less than 6 inches is preferred. In general any emitter design may be used that efficiently generates NTP; such designs are known to one of ordinary skill in the art, and are provided in, e.g., U.S. Patent Publication No. 2007/0045101.

Further with regard to multiple emitters, the embodiment of FIG. 1 shows a single emitter (40) coupled to a first portion of rod (30), with this emitter/rod configuration supported by insulator (20), which itself blankets a second portion of rod (20) that, in FIG. 1, is at a right angle to the first portion of rod (20) (the portion terminating in the emitter), and which descends through the interior of insulator (20) through to a high voltage source, HV. Thus in this configuration, there is a second portion of the rod which is blanketed by the insulator, and a first portion of the rod not blanketed by the insulator, where this first portion of the rod has an emitter coupled to its terminus (synonymously, proximal end). By reference to FIG. 1, it is clear that, in this embodiment the two portions of rod (30) form an L-shape. However, such an L-shape represents only one contemplated embodiment for the rod, and any other functioning shape is also contemplated, e.g., the first portion of the rod may be curved, etc. Also contemplated are configurations where the first portion of the rod is joined to the second (insulator-blanketed) portion so that a T or other structure providing more than one rod-terminus is formed. In an embodiment where a T is formed, an emitter or emitters may be attached to both ends of the T. Also contemplated are configurations that would place multiple emitters at the rod's proximal end where, in FIG. 1, only the single emitter (40) is shown. In other configurations there would be multiple emitters along the length of the rod, i.e., not simply at the proximal end.

As discussed above, in addition to one or more emitters, the first conductor comprises a conductive rod or other coupling device for placing the emitter(s) in the appropriate portion of the gas stream and for electrically connecting the emitter(s) to an external source of high voltage. In FIG. 1, the rod (30) is shown as a first portion that terminates in emitter (40) (i.e., has emitter (40) at its proximal end), and a second portion at right angles to the first portion (and joined to the first portion at the distal end of the first portion), where the second portion descends through (is blanketed/insulated by) insulator (20). Although this resulting configuration of the first/second portions of the rod is L-shaped, this shape should not be taken as limiting. In fact any appropriate shape may be selected depending upon design considerations, including, e.g., an arc shape (for the first portion), a T-shape for the entire rod, etc.

As has been discussed previously, electrically generated NTP is reduced or completely eliminated when current is diverted, e.g., as occurs by arcing. Also as discussed, the present invention contemplates a variety of means of preventing arcing as it occurs across short insulating paths, and also as it occurs when PM buildup creates new conduction paths for arcing.

However, despite the above measures, arcing sometimes may still occur. With sufficient arcing, enough vaporization/deposition of metal across the surface of an insulator can occur so as to result in the creation of a new conductive path. In order to diminish such metal deposition, in one aspect of the invention one or more "non-eroding" conductive rings or "washers" may be placed at one or both ends of the insulator to be protected. FIG. 1 provides an example of a single such non-eroding washer (50) provided at the end of insulator (20) nearest to emitter (40), i.e., a washer at the "proximal" end of insulator (20). Also contemplated are configurations of more than one such washer at the proximal end of the insulator, or of one or more washers at the end of the insulator closest to the second conductor (the "distal" end of the insulator; for FIG. 1 the portion of the insulator adjacent to case (10)).

"Non-eroding" refers to washers that are resistant to the erosive (metal ablative) effects of arcing, e.g., platinum washers, carbon steel washers, etc. The choice of washer material may be based on a number of factors, primarily duty cycle and cost. Thus for example a low power system that will need to survive only a few arcs over its life might utilize a relatively easily eroded material such as brass, whereas a system designed to function despite thousands of arc discharges might use carbon steel. High power or high reliability systems would preferably use platinum or a similarly erosion-resistant metal.

Applicants note that in the above discussion the washers in question have been described primarily in terms of a ring shape; this is only one of the contemplated forms such washers may take. Thus for example these washers may be oblong, ovoid, approximately square, approximately rectangular, etc., they may have gaps in them, etc. Applicants also note that the embodiment provided in FIG. 1 shows a washer that is flush with the exterior surface of insulator (20); this also is contemplated as only one of many possibly embodiments of the apparatus of the present invention. Thus in other embodiments the washer may protrude beyond the surface of the insulator; in other embodiments it may be recessed relative to the insulator.

With regard to the second conductor of the apparatus of the present invention, the embodiment of FIG. 1 shows a second conductor that is cylindrical, and that in addition serves as a containment vessel for the gas stream to be exposed to NTP, i.e., has at least one gas stream inlet and at least one gas stream outlet (a single inlet and a single outlet are shown in FIG. 1; these single outlets are non-limiting). However, other configurations are contemplated, for example ones in which the second electrode takes different shapes, or configurations in which there is a separate containment vessel with at least one gas stream inlet and one gas stream outlet to contain the first conductor, the second conductor, and the various other parts of the NTP-generating apparatus of the present invention.

Applicants note that the high voltage to be applied to the one or more first conductor and the one or more second conductor is preferably a direct current, and still more preferably a pulsed direct current, as discussed above. In terms of the polarity of the conductors, for the configuration provided in FIG. 1 Applicants have observed that a negatively polarized first conductor provides the best results. Therefore, in configurations similar to that of FIG. 1 (approximately central first conductor surrounded axially by a second conductor), a negatively polarized first conductor is preferred and, in general, this polarity is preferred in embodiments of the present invention.

Having described the apparatus of the present invention, and provided various non-limiting embodiments of this apparatus, Applicants will now discuss the use of this apparatus, either alone or in combination with other emission control/engine efficiency devices, e.g., Exhaust Gas Recirculation (EGR) systems, Turbocharging systems, Diesel Oxidation Catalyst(s) (DOCs), etc. These systems are well known to one of ordinary skill in the art.

Specifically, the apparatus of the present invention may be used alone to treat exhaust emissions, or it may be used in combination with other devices for such treatment. When used alone, the present device may be placed at any appropriate point in the exhaust gas stream; when appropriate, it may even be necessary to use tandemly repeated devices that are embodiments of the present invention. In such configurations, an exhaust stream to be treated to remove pollutants, particularly PM pollutants, is placed in contact with one or more NTP generation systems as provided in the present invention, with these NTP generation systems reducing the amount of pollutant(s) in the gas stream, particularly PM in the gas stream.

Figure 2:
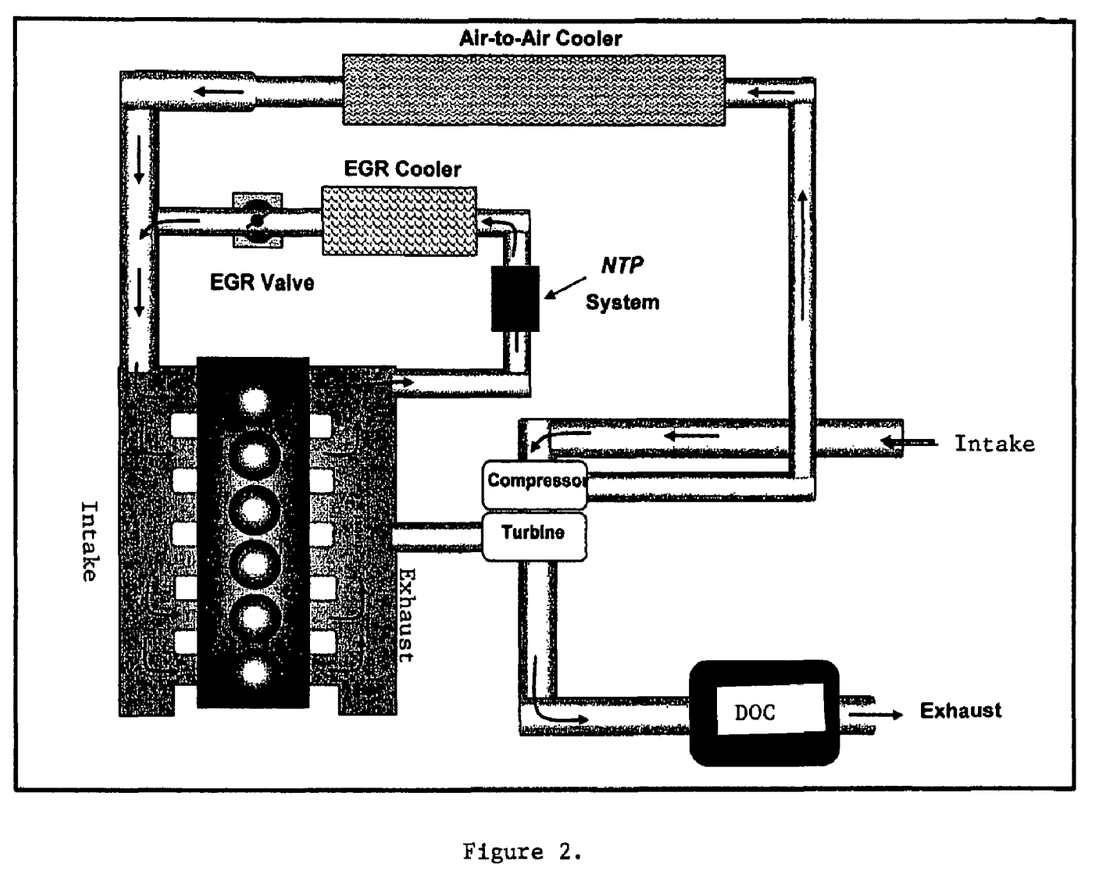
FIG. 2 provides a schematic diagram of a non-limiting embodiment of the present invention exemplifying the use of an embodiment or embodiments of the NTP apparatus of the present invention in the high-pressure EGR loop of a complex, multi-device engine system. The Diesel Oxidation Catalyst (DOC) of this system is show as the dark block immediately preceding the end of the tailpipe marked "Exhaust" in the figure.
Figure 3:
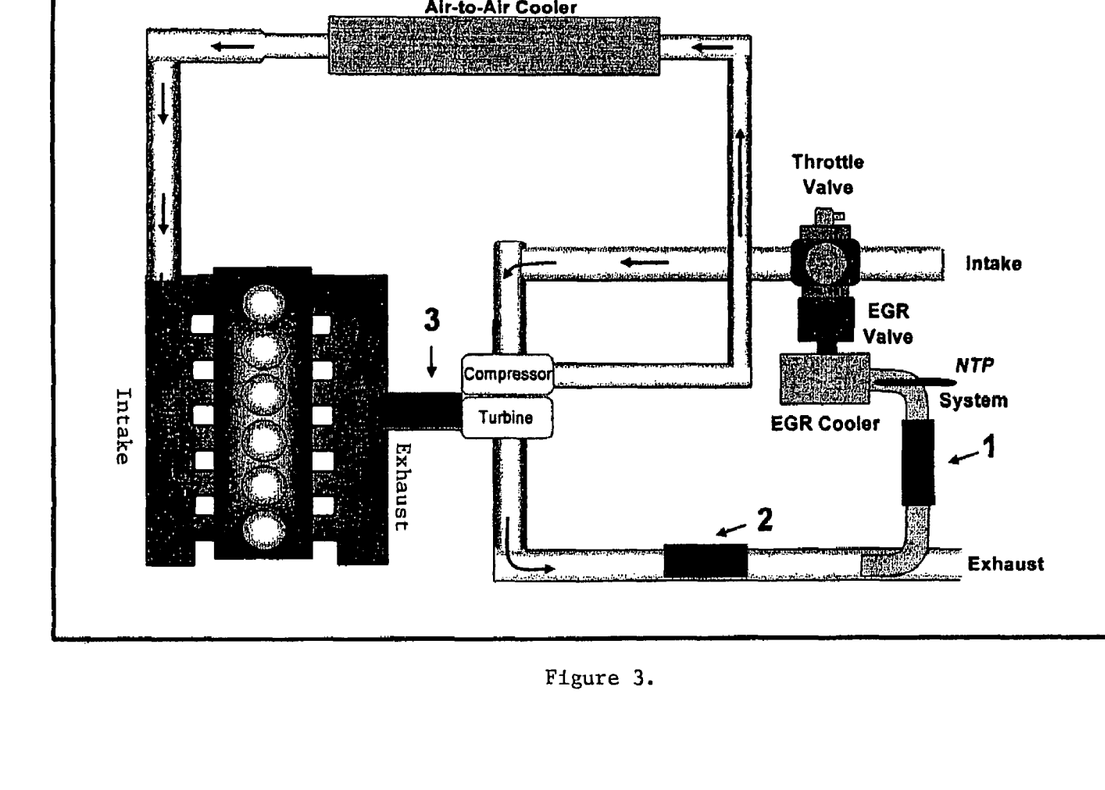
FIG. 3 provides a schematic diagram of three additional non-limiting locations for the NTP apparatus of the present invention in a complex, multi-device engine system.

In other aspects, the apparatus of the present invention may be used in combination with other engine emission/efficiency systems. In this regard, FIG. 2 provides a system in which the apparatus of the present device, whether standalone or integrated (see below), is provided between the engine exhaust and EGR cooler of FIG. 2. FIG. 3 shows three additional schematic locations where the apparatus of the invention (standalone or integrated) may be used. These locations are schematic only, and are not intended to represent exact placements of the apparatus (or multiple implementations of the apparatus) of the present invention. Thus for example location 2 in FIG. 3 is not intended to be specifically what, in the Figure, appears to be the midpoint of the pipe connecting the turbine to the exhaust. Instead, this position and the other positions in this figure (and the other figures provided herein) are merely schematic, i.e., indicate a position relative to a first and second landmark, in this case the turbine and the exhaust.

Figure 4:
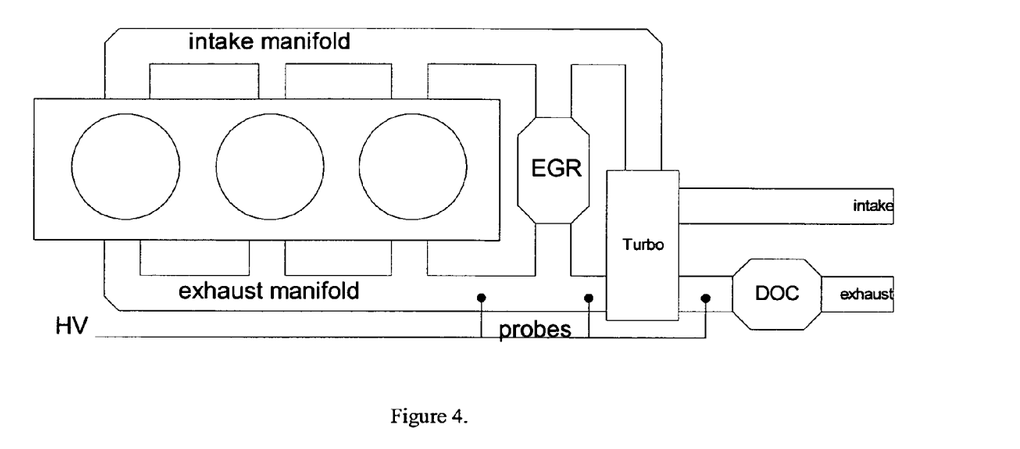
FIG. 4 provides a schematic diagram of a non-limiting embodiment of the present invention directed to the use of an embodiment or embodiments of the NTP apparatus of the present invention at various points in a complex, multi-device engine system.

FIG. 4 provides an additional summary of non-limiting locations for the apparatus of the present invention. This Figure shows three "probe" positions, which will be denoted as "A," "B," and "C," reading left to right horizontally across FIG. 4. "Probe," as used in this figure (or in FIG. 5; the synonymous terminology in the remaining figures is "NTP system" for FIG. 2 or numbered for FIG. 3) refers generically to one or more NTP generators of the present invention. Thus "probe" can refer to an entire standalone apparatus of the present invention, e.g., an apparatus as provided in FIG. 1, with this apparatus inserted at point A, B, C, or combination thereof. Alternatively, "probe" also refers to integrating the NTP-generating/treatment aspects of the present invention directly into the exhaust system, e.g., replacing case (10) of FIG. 1 with internal metal pipe already used in the exhaust system, such that the apparatus becomes an integral part of the system rather than a drop-in or add-on to the system.

Figure 5:
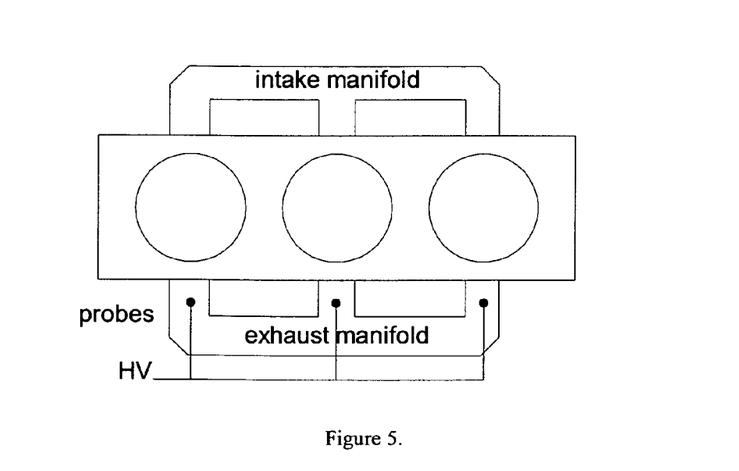
FIG. 5 provides a schematic diagram of a non-limiting embodiment of the present invention directed to the use of an embodiment of the NTP apparatus of the present invention at each exhaust valve of an engine.

FIG. 5 shows an embodiment of the present invention in which a probe is placed at each exhaust valve in the engine manifold in order to increase the removal of PM. This embodiment may be used in combination with any of the other embodiments provided herein, e.g., with any of the embodiments provided in FIGS. 2-4.

Having thus described the basic concept of the invention, it will be apparent to those skilled in the art that the foregoing disclosure is intended to be presented by way of example only, and is not limiting. Specifically, although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. An apparatus for reducing the amount of particulate matter in a gas stream, comprising:
    a) a first conductor contacting the gas stream, where the first conductor comprises a portion producing non-thermal plasma (NTP);
    c) a second conductor contacting the gas stream and electrically paired to the first conductor;
    d) an insulator electrically isolating the first conductor from the second conductor, where the insulator is a self-cleaning insulator; and
    e) a pulsed high-voltage supply connected between the first conductor and the second conductor; a time duration of a pulse applied from the pulsed high-voltage supply being selected to be less than the time required for a completed arc to form.

2. The apparatus of claim 1, where the self-cleaning insulator is cleaned by oxidative self-cleaning.

3. The apparatus of claim 1, where the self-cleaning insulator comprises an insulating portion which is sufficiently thin for oxidation of conductive material accumulated on its surface.

4. The apparatus of claim 1, where the self-cleaning insulator comprises a portion that is less than nominal thickness.

5. The apparatus of claim 4, where the portion of the self-cleaning insulator that is less than nominal thickness is of a thickness selected from the group consisting of 50%, 60%, 70%, 80%, and 90% of the nominal thickness.

6. The apparatus of claim 1, further comprising one or more non-eroding washers.

7. The apparatus of claim 6, where the one or more non-eroding washers are provided at the proximal end of the self-cleaning insulator.

8. The apparatus of claim 6, where the one or more non-eroding washers are provided at both the proximal end and the distal end of the self-cleaning insulator.

9. The apparatus of claim 1, where the first conductor is negatively polarized.

10. The apparatus of claim 1, where a pulsed current has a pulse width of between about 100 ns and about 1 ms.

11. The apparatus of claim 1 wherein the second conductor is a metal pipe used in an exhaust system.

12. A method for reducing the amount of particulate matter in a gas stream, comprising exposing the gas stream to the NTP generated by the apparatus of claim 1.

13. The method of claim 12, where the self-cleaning insulator of the apparatus comprises an insulating portion which is sufficiently thin for oxidation of conductive material accumulated on its surface.

14. The method of claim 12, where the thickness of the self-cleaning insulator is selected from the group consisting of 50%, 60%, 70%, 80%, and 90% of the nominal thickness.

15. The method of claim 13, where the apparatus further comprises one or more non-eroding washers.

16. The method of claim 12, where the gas stream is produced in a system containing at least one Exhaust Gas Recirculation (EGR) system, and where exposure of the gas stream to the NTP generated by the apparatus occurs between the engine exhaust and the at least one EGR system.

17. The method of claim 16, where the self-cleaning insulator of the apparatus comprises an insulating portion which is sufficiently thin for oxidation of conductive material accumulated on its surface.

18. The method of claim 16, where the thickness of the self-cleaning insulator is selected from the group consisting of 50%, 60%, 70%, 80%, and 90% of the nominal thickness.

19. The method of claim 13, where the apparatus further comprises one or more non-eroding washers.

20. A method for reducing the amount of particulate matter in a gas stream produced in a system containing more than one exhaust valve, comprising exposing the gas stream at each exhaust valve to the NTP generated by the apparatus of claim 1.

21. The method of claim 12, where the gas stream is produced in a system containing at least one Exhaust Gas Recirculation (EGR) system, and where exposure of the gas stream to the NTP generated by the apparatus occurs in an exhaust manifold and before a return path to the at least one EGR system.

22. The method of claim 12, where the gas stream is produced in a system containing at least one Exhaust Gas Recirculation (EGR) system, and where exposure of the gas stream to the NTP generated by the apparatus occurs in an exhaust manifold and before a Turbocharging system.

23. The method of claim 12 where exposure of the gas stream to the NTP generated by the apparatus occurs between a Turbocharging system and a Diesel Oxidation Catalyst (DOC) system.

24. The method of claim 12 where exposure of the gas stream to the NTP generated by the apparatus occurs at an output of at least one exhaust valve in an engine manifold.

25. An apparatus for reducing the amount of particulate matter in a gas stream, comprising:
    a) a first conductor contacting the gas stream, where the first conductor comprises a portion producing non-thermal plasma (NTP);
    c) a second conductor contacting the gas stream and electrically paired to the first conductor;
    d) an insulator electrically isolating the first conductor from the second conductor, where the insulator is a self-cleaning insulator; and
    e) a pulsed high-voltage supply connected between the first conductor and the second conductor; a time duration of a pulse applied from the pulsed high-voltage supply being selected to be less than the time required for a completed arc to form;
    where the self-cleaning insulator is cleaned by oxidative self-cleaning, where the apparatus further comprises one or more non-eroding washers, and where the first conductor of the apparatus has a pulsed direct current applied to it.

* * * * *